United States Patent
Cudak et al.

(10) Patent No.: US 9,415,305 B2
(45) Date of Patent: Aug. 16, 2016

(54) ADAPTIVE DIFFICULTY IN A MULTIPLAYER GAMING ENVIRONMENT

(75) Inventors: Gary D. Cudak, Creedmoor, NC (US); Christopher J. Hardee, Raleigh, NC (US); Randall C. Humes, Raleigh, NC (US); Adam Roberts, Moncure, NC (US)

(73) Assignee: International Business Machines Corporation, Armonk, NY (US)

( * ) Notice: Subject to any disclaimer, the term of this patent is extended or adjusted under 35 U.S.C. 154(b) by 309 days.

(21) Appl. No.: 13/402,960

(22) Filed: Feb. 23, 2012

(65) Prior Publication Data

US 2013/0225260 A1  Aug. 29, 2013

(51) Int. Cl.
*A63F 9/24* (2006.01)
*A63F 13/30* (2014.01)
*A63F 13/40* (2014.01)

(52) U.S. Cl.
CPC ............. *A63F 13/12* (2013.01); *A63F 13/10* (2013.01); *A63F 2300/558* (2013.01)

(58) Field of Classification Search
USPC .......................................... 463/20, 23, 40, 42
See application file for complete search history.

(56) References Cited

U.S. PATENT DOCUMENTS

| | | | | |
|---|---|---|---|---|
| 2004/0073325 | A1* | 4/2004 | Reeves | 700/91 |
| 2008/0146342 | A1* | 6/2008 | Harvey et al. | 463/42 |
| 2009/0017913 | A1* | 1/2009 | Bell et al. | 463/40 |
| 2010/0210362 | A1* | 8/2010 | Toompere | 463/42 |
| 2010/0304839 | A1* | 12/2010 | Johnson | 463/23 |

* cited by examiner

*Primary Examiner* — Paul A D'Agostino
*Assistant Examiner* — Brandon Gray
(74) *Attorney, Agent, or Firm* — Steven M. Greenberg, Esq.; CRGO Law

(57) ABSTRACT

Embodiments of the present invention provide a method, system and computer program product for adapting game difficulty through dynamic map generation in a multi-player gaming environment. In an embodiment of the invention, a method for adapting game difficulty through dynamic map generation in a multi-player gaming environment is provided. The method includes creating in memory of a computer a multi-player gaming environment. The method also includes identifying a player in the multi-player gaming environment, looking up performance data of the identified player and correlating the performance data of the identified player with a feature of the multi-player gaming environment. Finally, the method includes modifying the multi-player gaming environment to account for the correlated feature.

20 Claims, 2 Drawing Sheets

ADAPTIVE DIFFICULTY IN A MULTIPLAYER GAMING ENVIRONMENT

BACKGROUND OF THE INVENTION

1. Field of the Invention

The present invention relates to multiplayer gaming and more particularly to map generation in a multiplayer gaming environment.

2. Description of the Related Art

A multiplayer video game is one which multiple players can concurrently play a game within the same gaming environment. While single player games which have dominated computer gaming pit a single player against one or more automated opponents engaging in pre-programmatic behavior, multiplayer games pit different individuals against one another, each being limited to dynamic, on the fly behavior limited by the power of human thinking. Multi-player games also often provide a game environment in which different players engage in allied competition against other players whether human or computer automated. In the latter instance, cooperative multiplayer gaming environments reflect a 21st century version of the role playing board games of the 20th century.

Technologically, multiplayer gaming environments can be supported within a single gaming console, or in a distributed fashion over a computer communications network. In fact, some relatively recent multiplayer gaming environments are supported by geographically remote players communicatively connected to one another over the Internet through gaming consoles, personal computers, smart phone, personal digital assistants, or any combination thereof. However, in all instances, the virtual world in which the multiple players interact must remain consistent for all players. Thus, a mapping of the virtual world remains of paramount importance in a multiplayer gaming environment.

Many multiplayer gaming environments provide for static mapping of the virtual world in which a mapping of the virtual world is pre-stored and portions of the mapping are retrieved for use by different players when required. Thus, over time, a persistent gamer can become familiar with the mapping so as to gain an unfair advantage over less familiar gamers and ultimately, reduce the challenge experienced by the persistent gamer resulting in boredom. Thus, to provide for a consistent gaming challenge, the static maps can be changed over time by the developer of the multiplayer gaming environment. Yet, the need to provide new static maps periodically also increases the initial and long-term development costs for new games.

Other multiplayer gaming environments provide for dynamic mapping of the virtual world in which a relevant portion of the virtual world is generated in real time or near real time. As such, a gamer no matter how seasoned can lack familiarity with the mapping of the virtual world. The computer processing required to generate the dynamic mapping and the network latencies resulting from distributing the dynamically generated mapping to different players over the Internet, however, is significant and can result in delays to the start of each game. Finally, both static and dynamic mapping methods do not permit any form of real-time adjustment, when necessary.

Of note, the topography and features of a dynamically generated map in a multi-player gaming environment can directly correlate to the ease or difficulty faced by a game player in the environment. It naturally follows, then, that a dynamic map of particular topography with particular features can present unwanted difficulty or, alternatively, unwanted simplicity to a player in the multi-player gaming environment. As another matter, a dynamic map of particular topography with particular features can present unwanted difficulty to one player in the multi-player gaming environment, while providing little challenge to another player in the multi-player gaming environment. As such, an unfair advantage can be provided to one player in the multi-player gaming environment to the detriment or disadvantage of another player in the multi-player gaming environment.

BRIEF SUMMARY OF THE INVENTION

Embodiments of the present invention address deficiencies of the art in respect to dynamic map generation for multiplayer gaming and provide a novel and non-obvious method, system and computer program product for adapting game difficulty through dynamic map generation in a multi-player gaming environment. In an embodiment of the invention, a method for adapting game difficulty through dynamic map generation in a multi-player gaming environment is provided. The method includes creating in memory of a computer a multi-player gaming environment. The method also includes identifying a player in the multi-player gaming environment, looking up performance data of the identified player and correlating the performance data of the identified player with a feature of the multi-player gaming environment. Finally, the method includes modifying the multi-player gaming environment to account for the correlated feature.

Of note, the performance data includes by way of example, an instance when the identified player is defeated in the multi-player gaming environment, or an instance when the identified player is eliminating from playing in the multi-player gaming environment. In either circumstance, the feature can include by way of example, a topographical feature of a dynamically generated map for the multi-player gaming environment or a geographical feature of a dynamically generated map for the multi-player gaming environment. Finally, the multi-player gaming environment is modified, for example, by removing the correlated feature from the multi-player gaming environment, or by weighting the correlated feature to reduce but not eliminate a presence of the feature from the multi-player gaming environment.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for adapting game difficulty through dynamic map generation in a multi-player gaming environment. In accordance with an embodiment of the invention, player in a multi-player gaming environment can be identified and a data store of player loss data can be accessed to determine at least one characteristic of a dynamically generated map correlated to the player or a group of players having previously performed poorly in playing in the multi-player gaming environment. In response to identifying one or more characteristics of the dynamically generated map correlated to the player or group of players having previously performed poorly in playing in the multi-player gaming environment, the dynamically generated map can be modified to de-emphasize, reduce or other eliminate the identified characteristics from the dynamically generated map.

Figure 1:
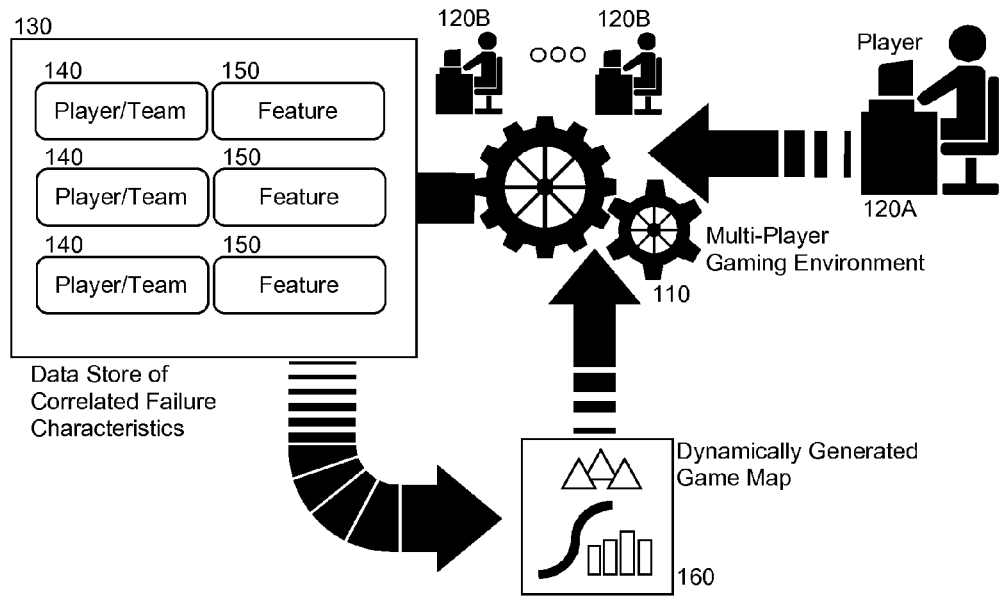
FIG. 1 is a pictorial illustration of a process for adapting game difficulty through dynamic map generation in a multi-player gaming environment.

In further illustration, FIG. 1 is a pictorial illustration of a process for adapting game difficulty through dynamic map generation in a multi-player gaming environment. As shown in FIG. 1, different players 120A, 120B in a multi-player gaming environment 110 can interact with one another in a dynamically generated game map 160 in a multi-player gaming environment 110. A particular player 120A amongst the players 120A, 120B can be identified and in response thereto, a data store of correlated failure characteristics 130 can be consulted. In this regard, within the data store 130 the identity 140 of the particular player 120 can be correlated to one or more features 150 of the multi-player gaming environment 110, for example a specific topographical feature or geographic feature. Thereafter, the multi-player gaming environment 110 can modify the correlated features 150 of the dynamically generated game map 160, for example by reducing the prominence or presence of the features 150 in the dynamically generated game map 160, or by outright removing the features 150 from the dynamically generated game map 160.

Figure 2:
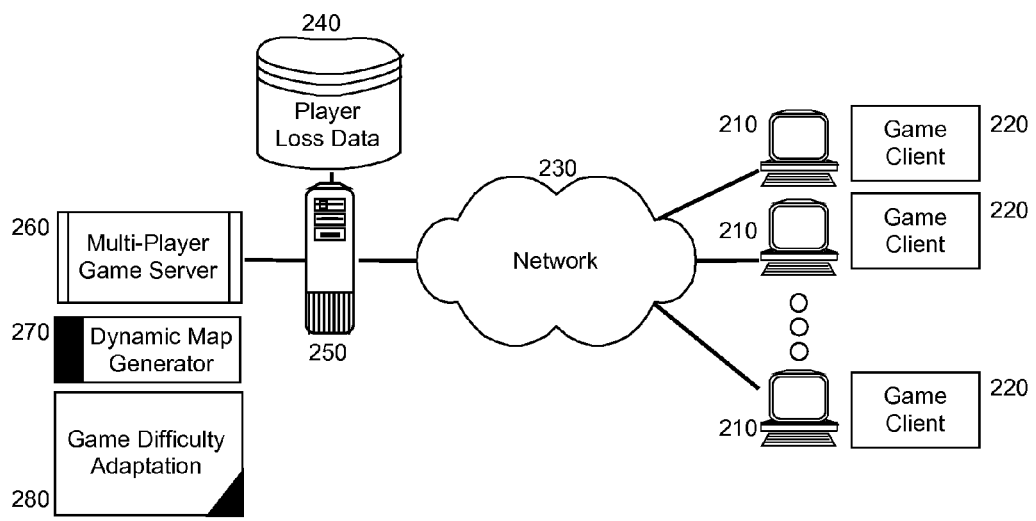
FIG. 2 is a schematic illustration of a multi-player gaming data processing system configured for adapting game difficulty through dynamic map generation; and, FIG. 3 is a flow chart illustrating a process for adapting game difficulty through dynamic map generation in a multi-player gaming environment.

The process described in connection with FIG. 1 can be implemented within a multi-player gaming data processing system. In yet further illustration, FIG. 2 schematically shows a multi-player gaming data processing system configured for adapting game difficulty through dynamic map generation. The system can include multiple different client computers 210, each with memory and at least one processor communicatively coupled over computer communications network 230 to a host computer 250 also with memory and at least one processor. The host computer 250 can include a multi-player game server 260 executing in the memory of the host computer 250. The multi-player game sever 260 can provide a multi-player gaming environment in which different players interact through game clients 220 executing in respective ones of the client computers 210.

Of note, a dynamic map generator 270 can be coupled to the multi-player game server 260. The dynamic map generator 270 can be configured to dynamically generate different game maps for the different game clients 220. Specifically, the dynamic map generator 270 can dynamically generate portions of the multi-player gaming environment for individual ones of the players relevant to a current position of the individual ones of the players in the multi-player gaming environment. In this way, each player interacting with the multi-player gaming environment can receive only a game map corresponding to a position of the player in the multi-player gaming environment.

Of note, a game difficulty adaptation module 280 can be coupled to the dynamic map generator 270. The game difficulty adaptation module 280 can include program code that when executed in the memory of the host computer 250 can identify a player interacting with the multi-player gaming environment through a game client 220. Responsive to the identification of the player, a data store of player loss data 240 can be consulted to determination of one or more features of the multi-player gaming environment correlating to the known performance of the identified player. Exemplary performance correlating to features of the multi-player gaming environment includes the elimination of the player from the game, or a portion of the game, or the defeat of the player in the game by another player. Likewise, exemplary features include topographical features of the multi-player gaming environment such as the presence and size of rivers, lakes or mountains, or geographic features of the multi-player gaming environment such as the presence and placement of buildings, streets and trees.

Subsequent to the determination of one or more features of the multi-player gaming environment correlating to the known performance of the identified player, the program code of the game difficulty adaptation module 280 can direct the dynamic map generator 270 to modify a dynamically generated map corresponding to the identified player so as to adjust the presence or absence of the features. For instance, the identified features can be weighted more heavily or less heavily than other features so as to reduce or increase the presence of the features, or to eliminate the features from the multi-player gaming environment. In this way, the difficulty of the game can be dynamically adapted through the generation of the map for the player according to the known correlation between the performance of the player and the features of the map.

Figure 3:
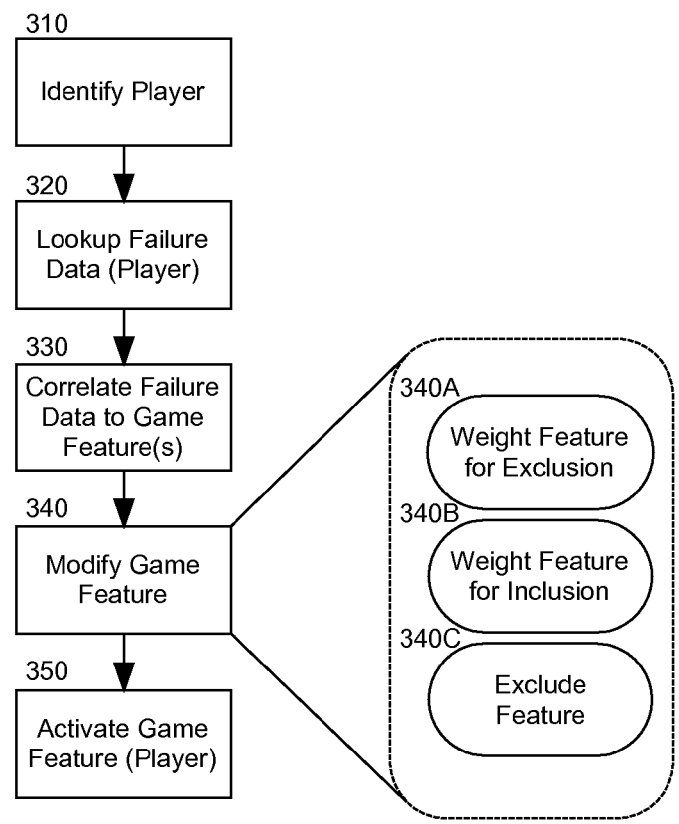

In even yet further illustration of the operation of the game difficulty adaptation module 280, FIG. 3 is a flow chart illustrating a process for adapting game difficulty through dynamic map generation in a multi-player gaming environment. Beginning in block 310, a player in the multi-player gaming environment can be identified and in block 320, failure data 320 can be located within a data store for the identified player. In block 330, the failure data 330 can be correlated to one or more features of the multi-player gaming environment, such as topographical or geographical features of a dynamic generated map in the multi-player gaming environment.

In block 340, one or more of the features can be modified within the multi-player gaming environment. In this regard, in sub-step 340A, one or more of the features can be weighted to make the feature more likely to be excluded from the multi-player gaming environment. As another alternative, in sub-step 340B one or more of the features can be weighted to make the feature more likely to be included in the multi-player gaming environment. As even yet another alternative, in sub-step 340C one or more of the features can be directly excluded from the multi-player gaming environment. In either circumstance, once the feature or features of the multi-player gaming environment have been modified, in block 350 the modified multi-player gaming environment can be activated for use by the player.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for adapting game difficulty through dynamic map generation in a multi-player gaming environment, the method comprising:
   creating in memory of a computer a multi-player gaming environment;
   dynamically generating portions of the multi-player gaming environment for individual ones of players relevant to a current position of the individual ones of the players in the multi-player gaming environment;
   identifying a player in the multi-player gaming environment;
   looking up performance data of the identified player and correlating the performance data of the identified player with a feature of a portion of a game map of the multi-player gaming environment relevant to a current position of the identified player; and,
   modifying the portion of the game map of the multi-player gaming environment in response to the correlated performance data.

2. The method of claim 1, wherein the performance data comprises an instance when the identified player is defeated in the multi-player gaming environment.

3. The method of claim 1, wherein the performance data comprises an instance when the identified player is eliminated from playing in the multi-player gaming environment.

4. The method of claim 1, wherein the feature is a topographical feature of a dynamically generated map for the multi-player gaming environment.

5. The method of claim 1, wherein the feature is a geographical feature of a dynamically generated map for the multi-player gaming environment.

6. The method of claim 1, wherein the multi-player gaming environment is modified by removing the correlated feature from the multi-player gaming environment.

7. The method of claim 1, wherein the multi-player gaming environment is modified by weighting the correlated feature to reduce but not eliminate a presence of the feature from the multi-player gaming environment.

8. A multi-player gaming data processing system comprising:
   a host computer with memory and at least one processor;
   a game server executing in the memory of the host computer and providing a multi-player gaming environment for different players accessible over a computer communications network, wherein portions of the multi-player gaming environment are dynamically generated for individual ones of the players relevant to a current position of the individual ones of the players in the multi-player gaming environment; and,
   a game difficulty adaptation module coupled to the game server, the module comprising program code enabled to identify a player in the multi-player gaming environment, to look up performance data of the identified player and correlate the performance data of the identified player with a feature of a portion of a game map of the multi-player gaming environment relevant to a current position of the identified player, and to modify the portion of the game map of the multi-player gaming environment in response to the correlated performance data.

9. The system of claim 8, wherein the performance data comprises an instance when the identified player is defeated in the multi-player gaming environment.

10. The system of claim 8, wherein the performance data comprises an instance when the identified player is eliminating from playing in the multi-player gaming environment.

11. The system of claim 8, wherein the feature is a feature of a dynamically generated map for the multi-player gaming environment.

12. The system of claim 8, wherein the multi-player gaming environment is modified by removing the correlated feature from the multi-player gaming environment.

13. The system of claim 8, wherein the multi-player gaming environment is modified by weighting the correlated feature to reduce but not eliminate a presence of the feature from the multi-player gaming environment.

14. A computer program product for adapting game difficulty through dynamic map generation in a multi-player gaming environment, the computer program product comprising:
   a computer readable storage memory having computer readable program code embodied therewith, the computer readable program code comprising:
   computer readable program code for creating in memory of a computer a multi-player gaming environment;
   computer readable program code for dynamically generating portions of the multi-player gaming environment for individual ones of players relevant to a current position of the individual ones of the players in the multi-player gaming environment;
   computer readable program code for identifying a player in the multi-player gaming environment;
   computer readable program code for looking up performance data of the identified player and correlating the performance data of the identified player with a feature of a portion of a game map of the multi-player gaming environment relevant to a current position of the identified player; and,
   computer readable program code for modifying the portion of the game map of the multi-player gaming environment in response to the correlated performance data.

15. The computer program product of claim 14, wherein the performance data comprises an instance when the identified player is defeated in the multi-player gaming environment.

16. The computer program product of claim 14, wherein the performance data comprises an instance when the identified player is eliminating from playing in the multi-player gaming environment.

17. The computer program product of claim 14, wherein the feature is a topographical feature of a dynamically generated map for the multi-player gaming environment.

18. The computer program product of claim 14, wherein the feature is a geographical feature of a dynamically generated map for the multi-player gaming environment.

19. The computer program product of claim 14, wherein the multi-player gaming environment is modified by removing the correlated feature from the multi-player gaming environment.

20. The computer program product of claim 14, wherein the multi-player gaming environment is modified by weighting the correlated feature to reduce but not eliminate a presence of the feature from the multi-player gaming environment.

* * * * *